(12) United States Patent
Alex et al.

(10) Patent No.: US 9,183,859 B1
(45) Date of Patent: Nov. 10, 2015

(54) HAMR WRITER POLE LENGTH CHARACTERIZATION

(71) Applicant: Western Digital (Fremont), LLC, Fremont, CA (US)

(72) Inventors: Michael Alex, Fremont, CA (US); Bogdan F. Valcu, Fremont, CA (US); David E. Wachenschwanz, Saratoga, CA (US); Andreas Moser, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/538,676

(22) Filed: Nov. 11, 2014

(51) Int. Cl.
*G11B 11/00* (2006.01)
*G11B 5/455* (2006.01)
*G11B 5/00* (2006.01)

(52) U.S. Cl.
CPC ........ *G11B 5/455* (2013.01); *G11B 2005/0021* (2013.01)

(58) Field of Classification Search
USPC .......... 369/13.33, 13.13, 13.32, 13.17, 13.02; 360/59, 75
See application file for complete search history.

(56) References Cited

U.S. PATENT DOCUMENTS

| | | | |
|---|---|---|---|
| 4,423,450 A * | 12/1983 | Hamilton | 360/111 |
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,583,953 B1 | 6/2003 | Han et al. | |
| 6,646,832 B2 | 11/2003 | Anaya-Dufresne et al. | |
| 6,661,612 B1 | 12/2003 | Peng | |
| 6,665,146 B2 | 12/2003 | Hawwa et al. | |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |

(Continued)

*Primary Examiner* — Tan X Dinh (57) ABSTRACT

The present disclosure generally relates to a HAMR head and techniques and apparatus for HAMR writer pole length characterization. One or more bits may be magnetically written on a disk using a leading edge of the writer pole at a first polarity. The disk may be moved under a body of the writer pole to magnetically write the one or more bits in the disk at a second polarity that is opposite to the first polarity to generate a feedback pulse having a signal amplitude. The signal amplitude of the feedback pulse may be measured as a function of writing frequency. A first effective length of the writer pole may be determined based on the measurements.

20 Claims, 6 Drawing Sheets

(56) References Cited

U.S. PATENT DOCUMENTS

| | | |
|---|---|---|
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,969,989 B1 * | 11/2005 | Mei ................... 324/210 |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,619,842 B2 | 11/2009 | Lee et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2007/0279803 A1 * | 12/2007 | Hirata et al. ............ 360/126 |
| 2010/0302671 A1 | 12/2010 | Ueno et al. |
| 2010/0321835 A1 * | 12/2010 | Zhang et al. ............ 360/319 |
| 2013/0128375 A1 * | 5/2013 | Livshitz et al. ............ 360/48 |
| 2013/0244541 A1 | 9/2013 | Yaemglin et al. |
| 2013/0293982 A1 | 11/2013 | Huber |

* cited by examiner

HAMR WRITER POLE LENGTH CHARACTERIZATION

BACKGROUND

1. Field of the Disclosure

Embodiments of the present disclosure generally relate to a heat-assisted magnetic recording (HAMR) head and, more particularly, techniques and apparatus for HAMR writer pole length characterization.

2. Description of the Related Art

As more and more information is being generated, smaller and smaller storage disks capable of storing large amounts of data are desired. Heat-assisted magnetic recording (HAMR) is an approach to increasing the density of data stored on hard disk drives.

HAMR sometimes referred to as thermally-assisted magnetic recording (TAMR or TAR) or energy assisted magnetic recording (EAMR) is a process whereby a localized area on the magnetic media is heated to a temperature above the Curie temperature, thereby, lowering the effective coercivity of the localized region. The lowered coercivity permits writing within this heated region. The data state becomes "fixed" once the media cools below the Curie temperature.

HAMR heads typically have a light source, such as a laser diode, that delivers the light through a waveguide and a near field transducer (NFT) to focus the energy on a very specific location. The light source is disposed adjacent to the write head on a surface opposite the air bearing surface (ABS). The light source is coupled to a submount, which is mounted to the slider.

During the course of HAMR head lifetime testing, damage to the pole and/or the NFT may occur, for example, due to write stress. The damage typically manifests itself as a change in the writing characteristics of the HAMR head. However, it can be difficult to determine whether the damage is to optical components of the HAMR head or to the magnetic components of the HAMR head based only on the change in the writing characteristics.

One approach to determining whether damage has occurred involves actually viewing the writer pole of the HAMR head, for example, using a scanning electron microscope (SEM) or a transmission electron microscope (TEM). However, this approach may involve removing media from a spin stand and dismantling the HAMR head in order to view the writer pole under the microscope.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a heat-assisted magnetic recording (HAMR) head and techniques and apparatus for HAMR writer pole length characterization. The HAMR head has a write head with a waveguide extending therethrough. A laser diode is coupled to a submount that is bonded to the write head using an adhesion layer, a solder structure, and a self-propagating multilayer alloying stack.

Figure 1:
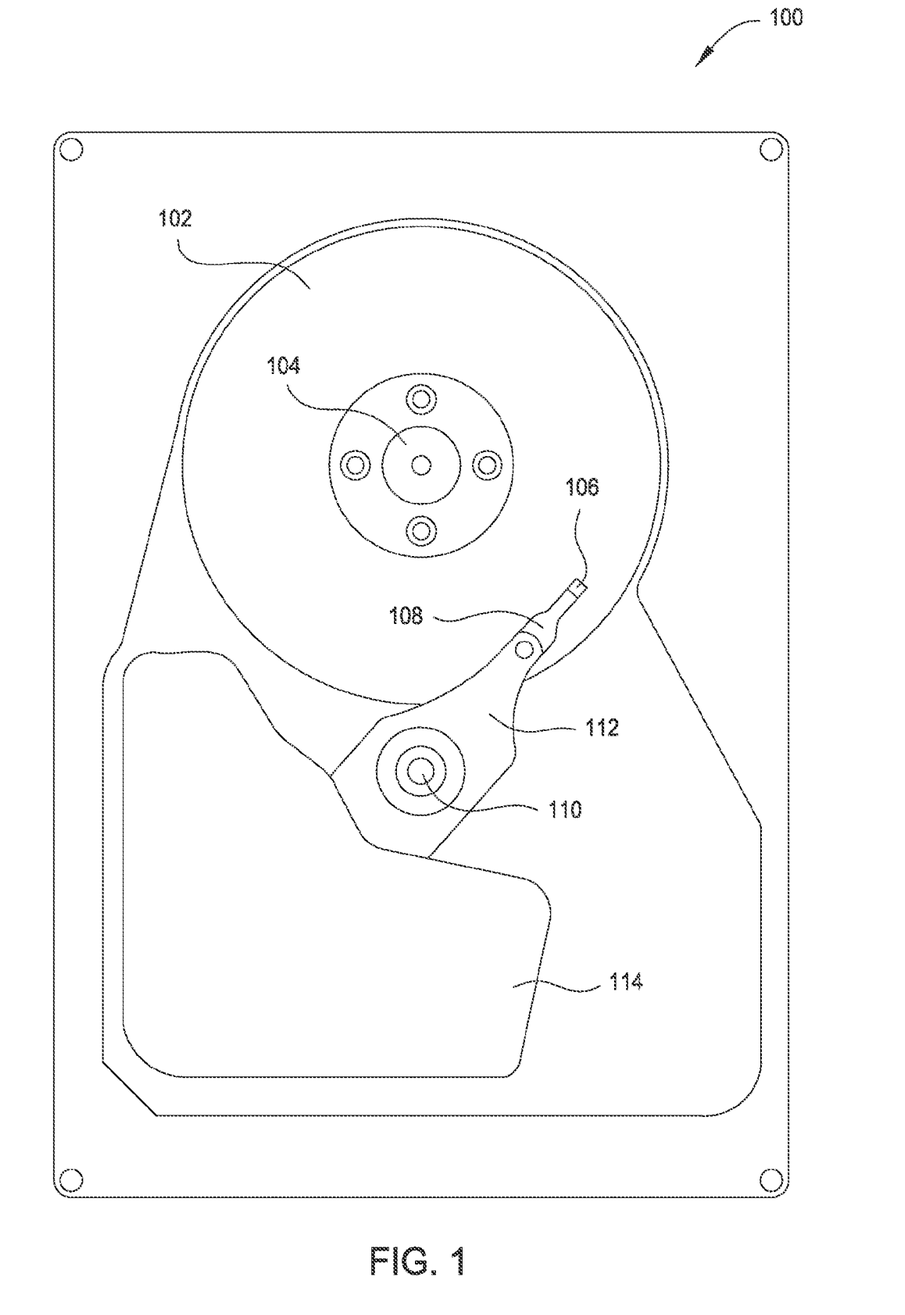
FIG. 1 is a schematic illustration of an example hard disk drive (HDD) according to an embodiment of the present disclosure.

FIG. 1 is a schematic illustration of a magnetic recording device, such as a hard disk drive (HDD) 100 according to one embodiment. The HDD 100 includes at least one magnetic recording medium, such as a disk 102 that is supported on a spindle 104. A motor causes the spindle 104, and hence the disk 102, to rotate. A magnetic head 106 that is mounted on a slider 108 moves over the disk 102 to read and write information from/to the disk 102. The head 106 rides on an air bearing above the disk 102 during read/write operations. The slider 108 is coupled to an actuator 110 by a suspension 112. The suspension 112 provides a slight spring force which biases the slider 108 towards the disk surface. Each actuator 110 is attached to an actuator means 114 that controls the movement of the head 106 relative to the disk 102.

Figure 2:
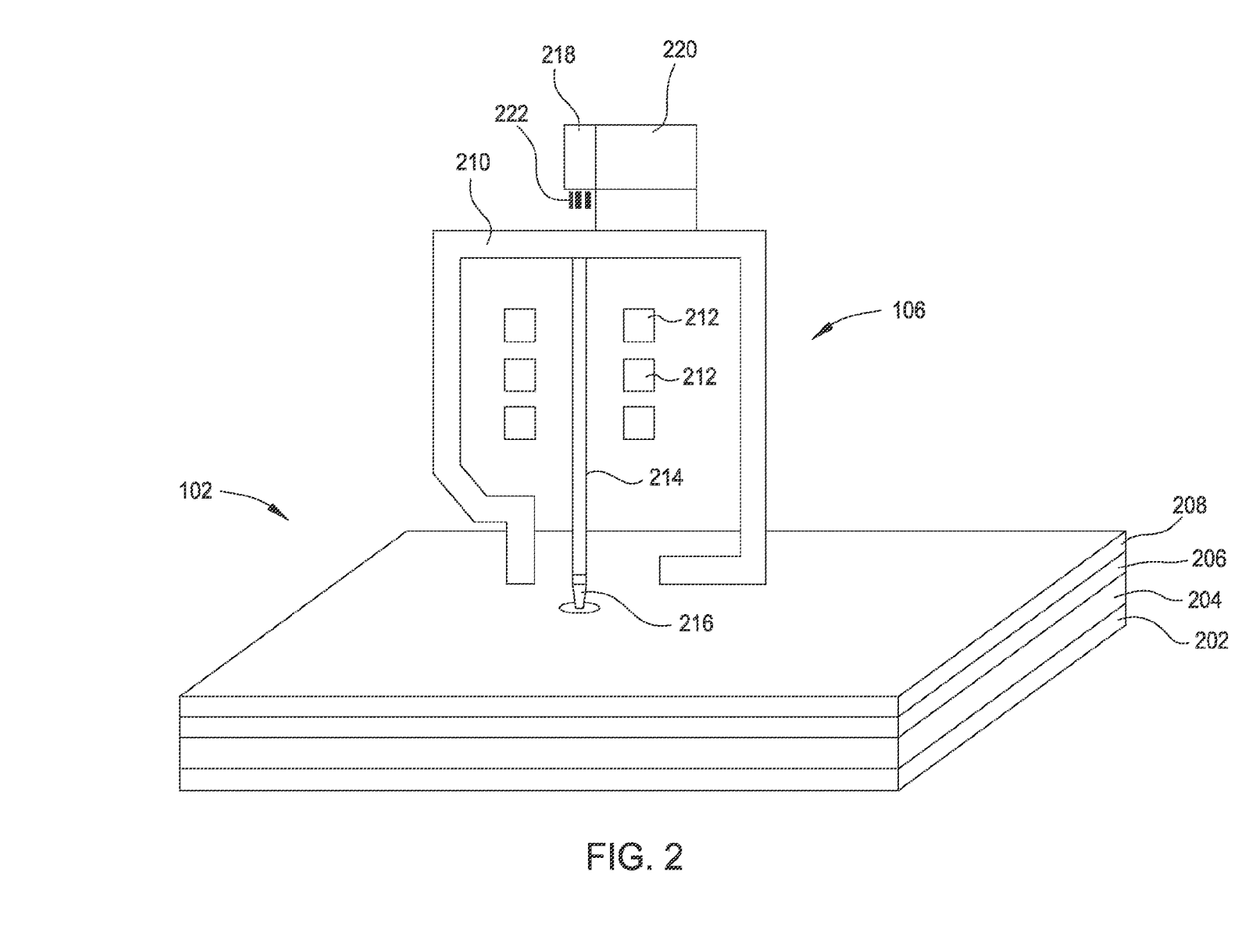
FIG. 2 is a schematic isometric illustration of an example HAMR head according to an embodiment of the present disclosure.

FIG. 2 is a schematic isometric illustration of a HAMR head 106 adjacent a magnetic disk 102. The disk 102 includes a substrate 202, a soft underlayer 204, a nucleation layer 206 and a magnetic recording layer 208. The HAMR head 106 is a write head that includes a writer yoke 210 and writer coils 212. The coils 212 surround the waveguide 214. The waveguide 214 is adjacent the NFT 216 which is disposed at the ABS. A light source 218, such as a laser diode, is coupled to a submount 220 that is bonded to the slider 108. The light source 218 emits light 222 that is directed to the waveguide 214.

In a typical HAMR head design, the near-field transducer (NFT), which heats the media, is in close proximity to the writer pole that writes the data to the media. For example, the down-track separation between the NFT and the writer pole edge may be on the order of a few tens of nanometers (nm). Due to this close proximity and the high temperatures reached by the NFT and recording media during a recording process, various defects may occur during writing data to the media. For example, due to heat, the NFT and other nearby materials may diffuse into the pole. As another example, the pole may partially melt or smear. As yet another example, the magnetic properties of the heated pole regions may change. As a result of these example defects or other defects that may occur, the effective length of the pole may change; the pole may become physically and/or magnetically shorter in the down-track direction.

Therefore, a need exists for techniques and apparatus for determining when such changes have occurred to the pole, and to quantify these changes.

A measurement technique is provided herein that may allow one to measure, non-destructively, the down-track effective length of the HAMR writer magnetic pole on the spin-stand. In addition, the technique may be used to determine (e.g., quantify) changes in the pole length, for example, due to corrosion, diffusion of foreign materials into the pole, or damage induced during the recording process such as write stress or melting. The technique may also allow one to distinguish between magnetic changes and optical changes in the HAMR head.

In HAMR recording, magnetic media (e.g., HAMR media), for example bit cells, is heated by an optical spot from the NFT, after which it moves to the vicinity of the leading edge of the magnetic pole of the writer pole. The thermal spot profile may render the media susceptible to writing just ahead of the leading edge of the write pole. As the media cools, transitions may then be written magnetically on the media at the vicinity of the leading edge of the magnetic pole. After the magnetic transition and bit cell and written by the leading edge of the pole, the media may be moved under the body of the pole (e.g., to the trailing edge of the pole). At this point, the media may be "frozen" (e.g., sufficiently cooled) such that if the polarity of the magnetic field from the pole may be reversed, for example, to write a bit cell of opposite polarity, the media does not switch or get reversed. In this case, where the media is not cooled sufficiently when the field from the pole reversed, the just-written magnetic bit cell may be erased to varying degrees by the field from the body of the pole. This effect may be referred to as "erase after write". In HAMR recording, the degree of erase after write may be a complex function of the head design, the media heating and cooling properties, media grain size, and anisotropy distributions, etc.

According to one embodiment of the present disclosure, erase after write data may be used to characterize the pole by performing measurements with the HAMR head on conventional perpendicular magnetic recording (PMR) media. PMR media may be used because the HAMR head can write this media without turning on the laser. According to an embodiment, if the write current is too low, the trailing edge of the pole may be dominant such that interference does not occur to create nulls in the readback signal. The write current which results in well-defined nulls may decrease over time as the pole degrades (e.g., which may be determined using saturation curves). Thus, it may be desirable to decrease the write current after testing. By selecting the appropriate write current value, bit cells may be written in the PMR media with the leading edge of the HAMR write pole. These bits cells may then be erased to varying degrees once they are moved under the write pole and the write current (i.e., the magnetic field) is reversed.

According an embodiment, if the bits cells are longer than the write pole length in the down-track direction, the erase after write effect may be small, since only a small fraction of the bit cell may erased under the pole. However, as the bit cell size is reduced (i.e., the recording density is increased), the bit cell size becomes comparable to the length of the write pole and erase after write effects may become more pronounced. Thus, maximum erase after write occurs when the bit cell length is equal to the down-track pole dimension. Therefore, according to one embodiment of the present disclosure, by measuring the signal amplitude as a function of the writing frequency, a "null" may appear when the bit cell length matches the pole length, for example due to destructive interference signal cancellation, which may be referred to as "signal roll-off". Accordingly, the effective length of the magnetic pole may be determined corresponding to a write frequency where a null appears in the signal amplitude.

According to an embodiment of the present disclosure, the effective length of the magnetic pole can be determined based on the write frequency where the null occurs based on the following formula:

$$\text{pole length } (\mu m) = \frac{N}{kFCI} \times 25.4,$$

where kFCI is the write current (in kFCI) where the first null occurs, and N is the number of transitions that have occurred (i.e., N=1 for the first null).

Figure 3:
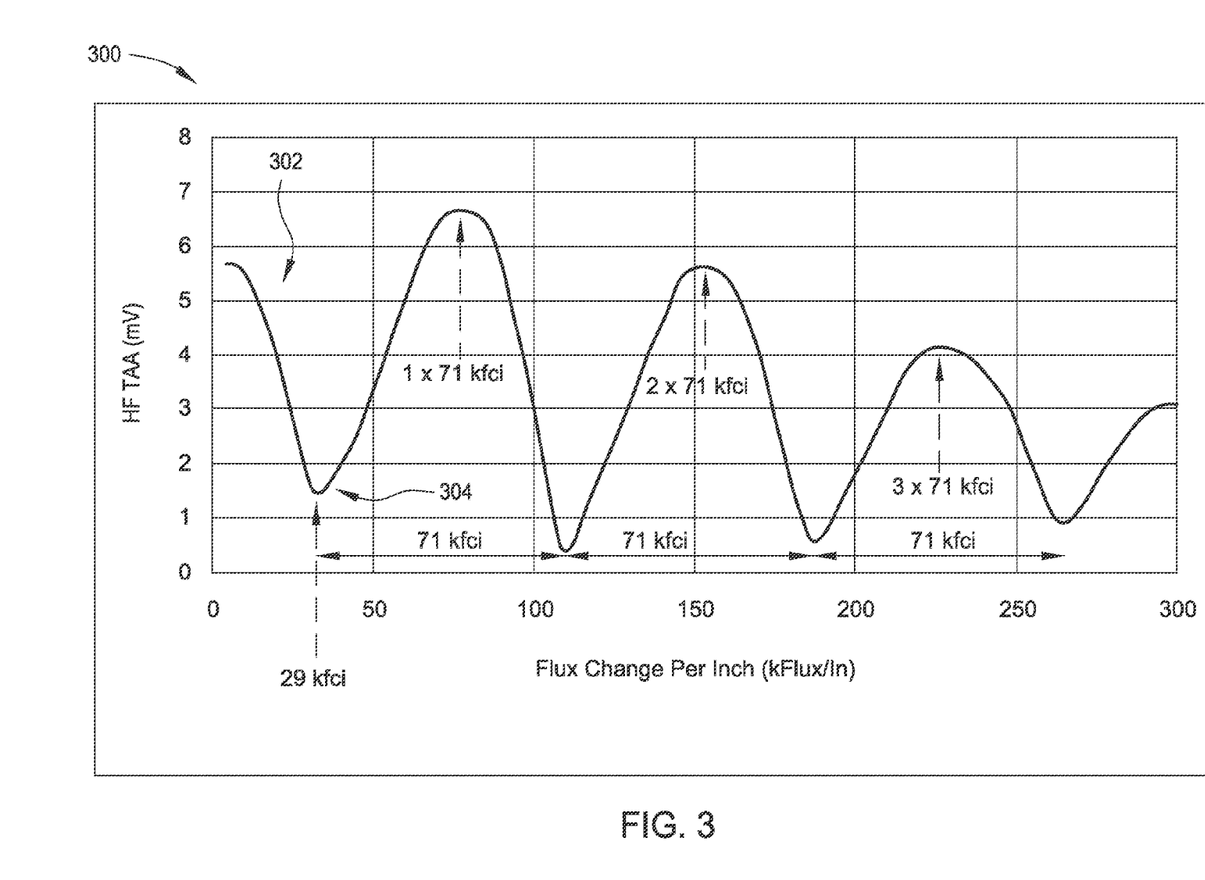
FIG. 3 is a graph illustrating an example readback signal as a function of recording density when PMR media is written magnetically with a HAMR write pole according to an embodiment of the present disclosure.

FIG. 3 is a graph 300 illustrating an example readback signal 302 as a function of recording density (i.e., linear density) when PMR media is written magnetically with a HAMR write pole (e.g., without using a laser) according to an embodiment of the present disclosure. As shown in FIG. 3, the first minimum 304 or "null" in the example readback signal may occur at 29 kFCI. This may correspond to a bit cell length of 858 nm, which may correspond to the length of design of the HAMR head used for the measurement. As shown in FIG. 3, additional periodic maxima (e.g., when there is constructive interference) and minima (e.g., when there is destructive interference) occur as the linear recording density is increased. Each maxima and minima may correspond to a transition. The maxima and minima may correspond to even and odd number of bits being under the pole, respectively. The distance between two maxima or between two minima may correspond to notch length of the pole.

Figure 4:
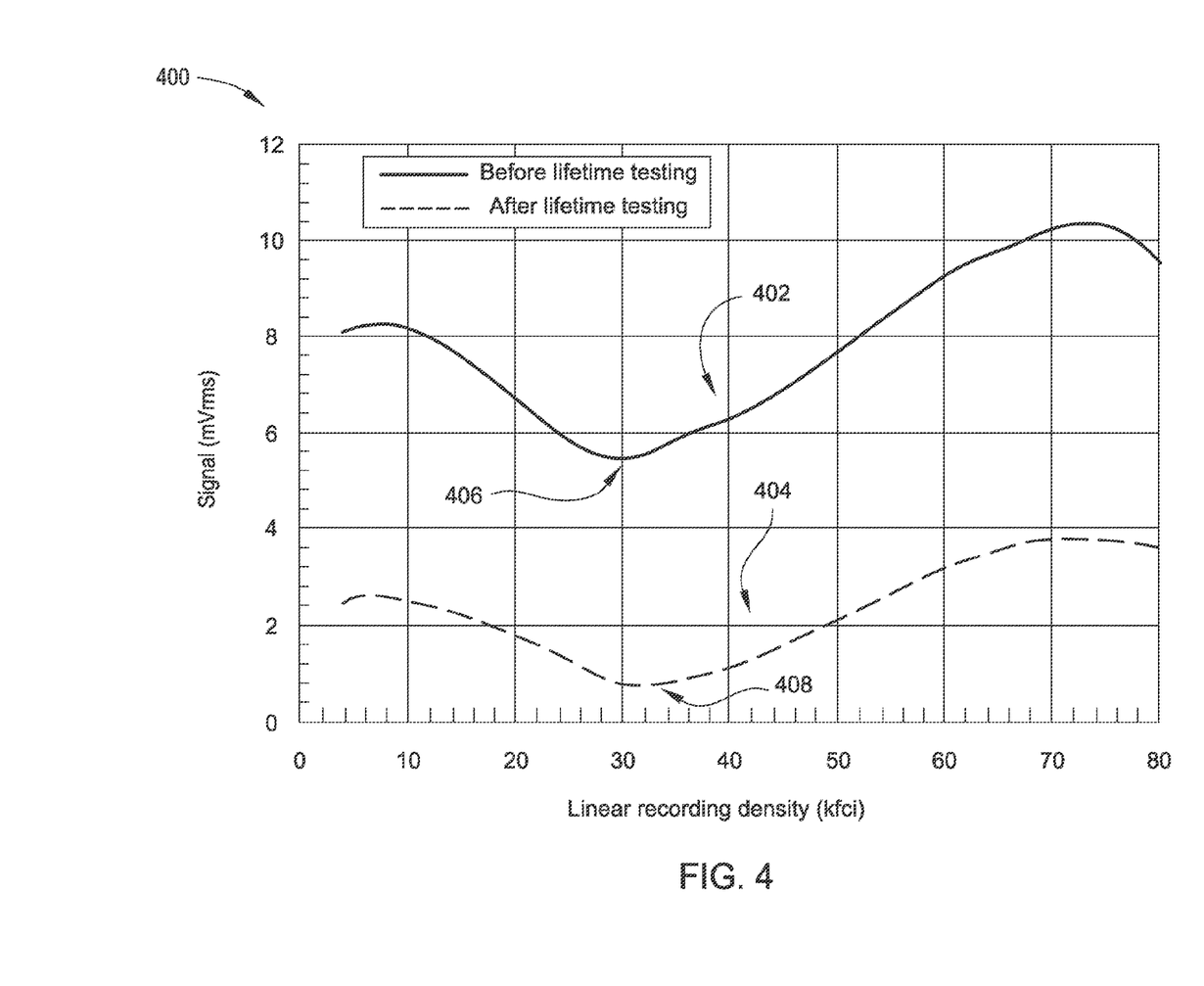
FIG. 4 is a graph illustrating example readback signals as a function of recording density in the vicinity of a first null of a HAMR head writer pole before and after lifetime testing according to an embodiment of the present disclosure.

The ability to readily measure the length of writer pole may allow for the measurement of changes in the pole length, for example after a period of use or testing, due to device operation and failure. FIG. 4 is a graph 400 illustrating example readback signals 402 and 404 as a function of recording density in the vicinity of a first null of a HAMR head writer pole before and after lifetime testing (e.g., after lifetime stress testing), respectively, according to an embodiment of the present disclosure. According to one embodiment of the present disclosure, a first readback signal from PMR media may be obtained to determine a length of the writer pole before any use or lifetime testing to. For example, as shown in FIG. 4, the first readback signal 402 may show the first null 406 at 29 kFCI corresponding to the writer pole length of 858 nm. Subsequently, lifetime testing may be conducted using the HAMR head and writer pole to write HAMR media. According to an embodiment, the period of the lifetime testing may be for any duration of interest and the lifetime testing may be paused any number of times to determine pole length at various desired intervals. After a period of testing, the HAMR media may be replaced with PMR media in order to determine the length of writer pole. After testing, the null increases in frequency (linear density) which may signify an effective reduction in the magnetic ole length. As shown in FIG. 4, a second readback signal 404 may be obtained with the first null 408 occurring at roughly 33 kFCI which corresponds to pole length of 805 nm. Thus, it can be seen that during the period of lifetime testing, the length of pole shorted by 53 nm.

Based on the results of the pole length determinations before, after, and/or during lifetime testing, the HAMR writer pole may be characterized. For example, it may be determined how fast the pole degrades during testing and if the rate at which the pole degrades changes throughout the lifetime testing. Additionally, if the length of the pole has not changed after the lifetime testing, or has not changed by an expected amount, but the signal amplitude has decreased, it may be determined that a defect has occurred other than to the writer pole, for example, that NFT may be degraded.

According to an embodiment, the measurement techniques described with respect to FIG. 3 and FIG. 4 may used to determine pole lengths of HAMR writer poles of different designs, dimensions, and geometries.

Figure 5:
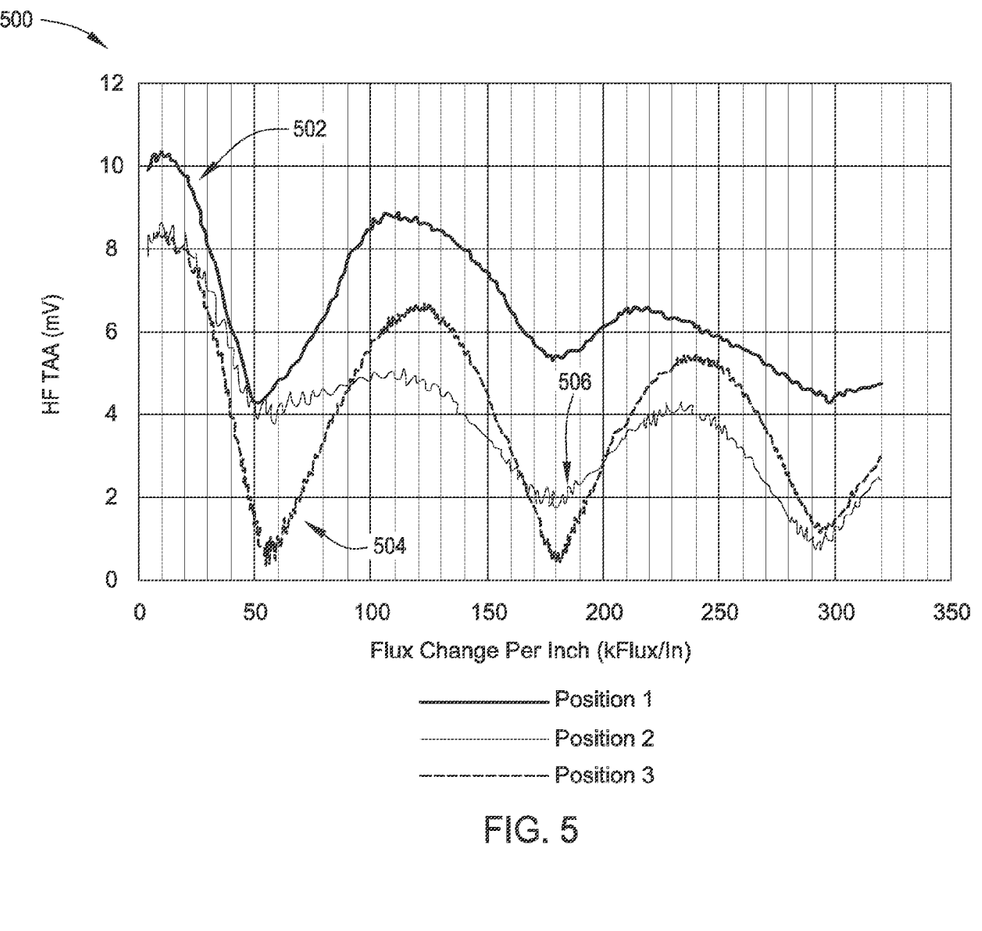
FIG. 5 is a graph illustrating example readback signals as a function of recording density when PMR media is written magnetically with a HAMR write pole in a cross-track direction according to an embodiment of the present disclosure.

FIG. 5 is a graph 500 illustrating example readback signals as a function of recording density when PMR media is written magnetically with a HAMR write pole in a cross-track direction according to an embodiment of the present disclosure. FIG. 5 illustrates three different readback signals for PMR media written with a laser turned off at three different track positions for the same HAMR writer pole. As shown in FIG. 5, measurements may be performed at different off-track positions in order to probe the pole for length variations in the cross-track direction. For example, a first readback signal 502 may be obtained at position 1 (e.g., at track center), a second readback signal 506 may be obtained at position 2 (e.g., the right-hand side lobe), and a third readback signal 506 may be obtained at position 3 (e.g., the left-hand side lobe).

Figure 6:
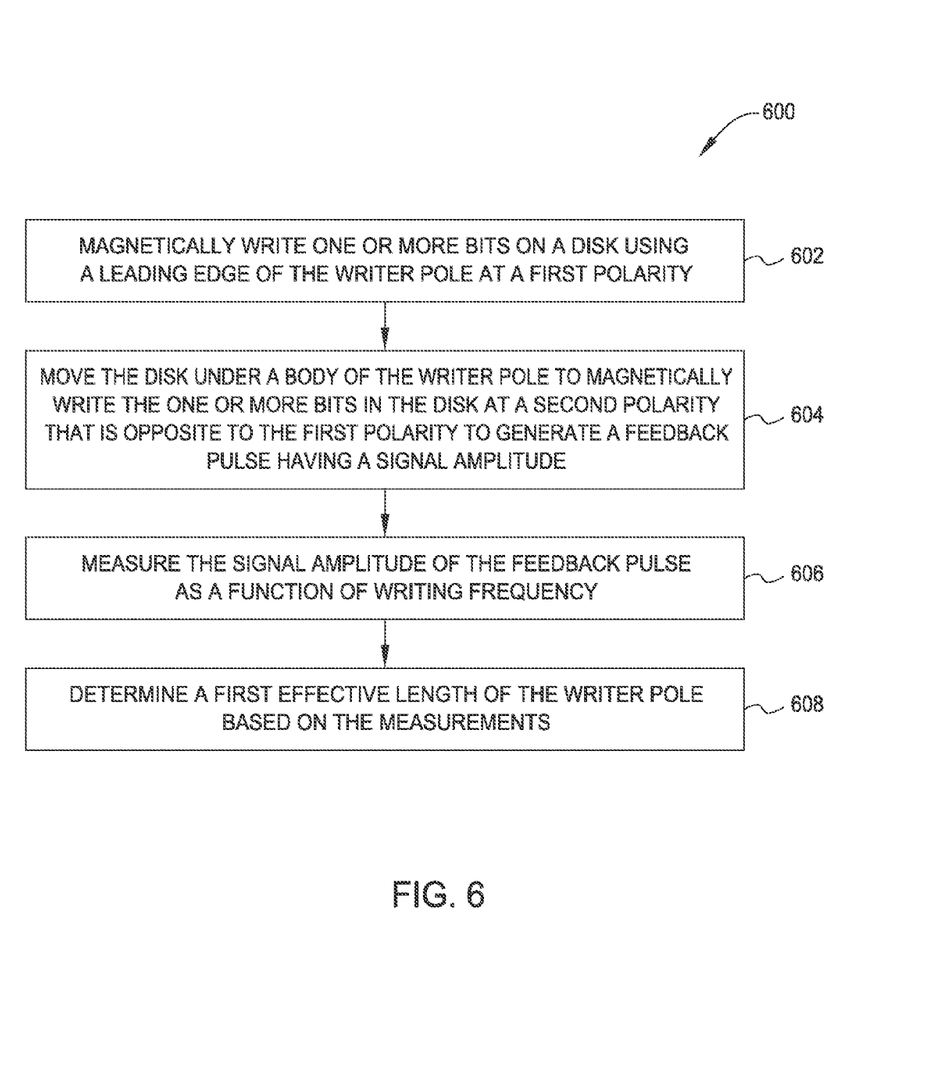
FIG. 6 is a flow chart showing the method of determining an effective length of a writer pole of a magnetic recording head according to an embodiment of the present disclosure.

FIG. 6 is a flow chart 600 showing the method of determining an effective length of a writer pole of a magnetic recording head (e.g., an HAMR head) according to an embodiment of the present disclosure.

As shown in box 602, one or more bits may be magnetically written (e.g., using an optimal write current selected based on a saturation curve to provide a well-defined null in the signal) on a disk (e.g., a PMR disk) using a leading edge of the writer pole at a first polarity. According to an embodiment, the disk may be on a spin stand.

As shown in box 604, disk may be moved under a body of the writer pole to magnetically write the one or more bits in the disk at a second polarity that is opposite to the first polarity to generate a feedback pulse having a signal amplitude.

As shown in box 606, the signal amplitude of the feedback pulse may be measured as a function of writing frequency (e.g., using a narrowband filter).

As shown in box 608, a first effective length of the writer pole may be determined based on the measurements. For example, a signal waveform may be generated based on the measured signal amplitude as a function of the writing frequency, a quotient of a number of minima and maxima that occur in the signal waveform divided by a length of writing frequency between the first and last minima or maxima of the number of minima and maxima may be computed. The first effective length may be determined as the product of the quotient multiplied by a scalar value (e.g., 25.4).

According to an embodiment, the method may further include magnetically writing one or more bits on a HAMR disk subsequent to determining the first effective length of the writer pole but prior to determining a second effective length of the writer pole. After writing the one or more bits on the HAMR disk, a second effective length of the writer pole may be determined using the PMR disk (e.g., at an off-track position). A difference between the first effective length and the second effective length of the writer pole may be determined. If the second effective length is less than the first effective length, it may be determined that the writer pole has a magnetic defect. Alternatively, if the second effective length is equal to or greater than the first effective length, it may be determined that the writer pole has an optical defect or that a NFT has a defect.

The techniques disclosed herein may allow for determining a length of a write pole of the HAMR head. Since the technique is performed by measuring erase after write on PMR media, the media may remain on the spin-stand throughout the determination. Because degradation of the writer pole can be determined, the techniques may allow one to distinguish between the optical and magnetic failure modes of the HAMR head. These techniques may be useful in failure analysis and quality control of HAMR heads, for example, in a design and manufacturing process.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c., as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for determining an effective length of a writer pole of a magnetic recording head, comprising:
    magnetically writing one or more bits on a disk using a leading edge of the writer pole at a first polarity;
    moving the disk under a body of the writer pole to magnetically write the one or more bits in the disk at a second polarity that is opposite to the first polarity to generate a feedback pulse having a signal amplitude;
    measuring the signal amplitude of the feedback pulse as a function of writing frequency; and
    determining a first effective length of the writer pole based on the measurements.

2. The method of claim 1, wherein determining the first effective length of the writer pole based on the measurements comprises:
    generating a signal waveform based on the measured signal amplitude as a function of the writing frequency;
    computing a quotient of a number of minima and maxima that occur in the signal waveform divided by a length of writing frequency between the first and last minima or maxima of the number of minima and maxima; and
    determining the first effective length to be a product of the quotient multiplied by a scalar value.

3. The method of claim 2, wherein the scalar value is 25.4.

4. The method of claim 1, wherein the disk comprises a perpendicular magnetic recording (PMR) disk.

5. The method of claim 1, further comprising:
determining a second effective length of the writer pole subsequent to determining the first effective length of the writer pole; and
determining a difference between the first effective length and the second effective length of the writer pole.

6. The method of claim 5, further comprising:
determining that the writer pole has a magnetic defect if the second effective length is less than the first effective length.

7. The method of claim 5, further comprising:
determining that the writer pole has an optical defect or that a near field transducer (NFT) has a defect if the second effective length is equal to or greater than the first effective length.

8. The method of claim 5, further comprising:
magnetically writing one or more bits on a heat-assisted magnetic recording (HAMR) disk subsequent to determining the first effective length of the writer pole but prior to determining the second effective length of the writer pole.

9. The method of claim 5, wherein the second effective length is determined by measuring signal amplitude and writing frequency at an off-track position.

10. The method of claim 1, wherein the magnetic recording head comprises a heat-assisted magnetic recording (HAMR) head.

11. The method of claim 1, wherein the signal amplitude is measured using a narrowband filter.

12. The method of claim 1, further comprising magnetically writing the one or more bits using a write current at which a saturation curve for the write current has a minima.

13. The method of claim 1, wherein the disk is located on a spin stand.

14. An apparatus for determining an effective length of a writer pole of a magnetic recording head, comprising:
means for magnetically writing one or more bits on a disk using a leading edge of the writer pole at a first polarity;
means for moving the disk under a body of the writer pole to magnetically write the one or more bits in the disk at a second polarity that is opposite to the first polarity to generate a feedback pulse having a signal amplitude;
means for measuring the signal amplitude of the feedback pulse as a function of writing frequency; and
means for determining a first effective length of the writer pole based on the measurements.

15. The apparatus of claim 14, wherein the means for determining the first effective length of the writer pole based on the measurements comprises:
means for generating a signal waveform based on the measured signal amplitude as a function of the writing frequency;
means for computing a quotient of a number of minima and maxima that occur in the signal waveform divided by a length of writing frequency between the first and last minima or maxima of the number of minima and maxima; and
means for determining the first effective length to be a product of the quotient multiplied by a scalar value.

16. The apparatus of claim 14, further comprising:
means for determining a second effective length of the writer pole subsequent to determining the first effective length of the writer pole; and
means for determining a difference between the first effective length and the second effective length of the writer pole.

17. A system for determining an effective length of a writer pole of a magnetic recording head, comprising:
a disk;
a writer pole comprising a body portion and configured to magnetically write one or more bits on the disk using a leading edge of the writer pole at a first polarity;
a device configured to move the disk under the body portion of the writer pole, wherein the writer pole is further configured to:
magnetically write the one or more bits in the disk at a second polarity that is opposite to the first polarity to generate a feedback pulse having a signal amplitude; and
a processing system configured to:
measure the signal amplitude of the feedback pulse as a function of writing frequency; and
determine a first effective length of the writer pole based on the measurements.

18. The system of claim 17, wherein determining the first effective length of the writer pole based on the measurements comprises:
generating a signal waveform based on the measured signal amplitude as a function of the writing frequency;
computing a quotient of a number of minima and maxima that occur in the signal waveform divided by a length of writing frequency between the first and last minima or maxima of the number of minima and maxima; and
determining the first effective length to be a product of the quotient multiplied by a scalar value.

19. The system of claim 17, wherein the disk comprises a perpendicular magnetic recording (PMR) disk.

20. The system of claim 17, wherein the processing system is further configured to:
determine a second effective length of the writer pole subsequent to determining the first effective length of the writer pole; and
determine a difference between the first effective length and the second effective length of the writer pole.

* * * * *